Jan. 6, 1942.  T. B. RHINES  2,268,552
ROTOR OPERATING MECHANISM
Filed July 14, 1939
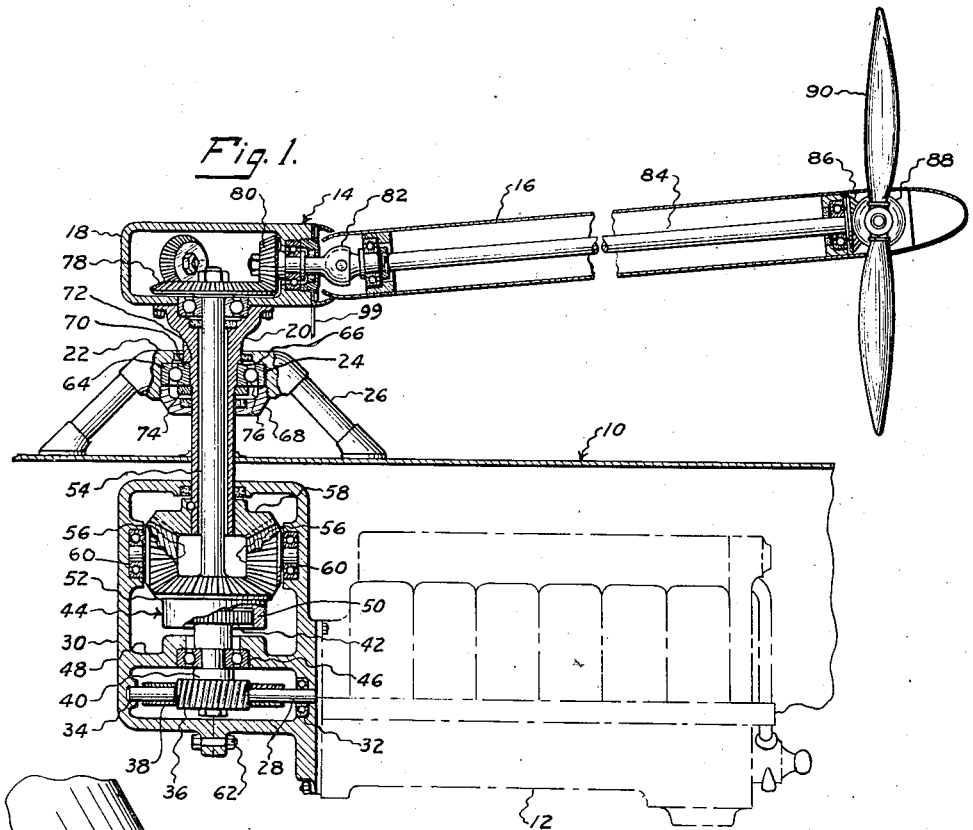
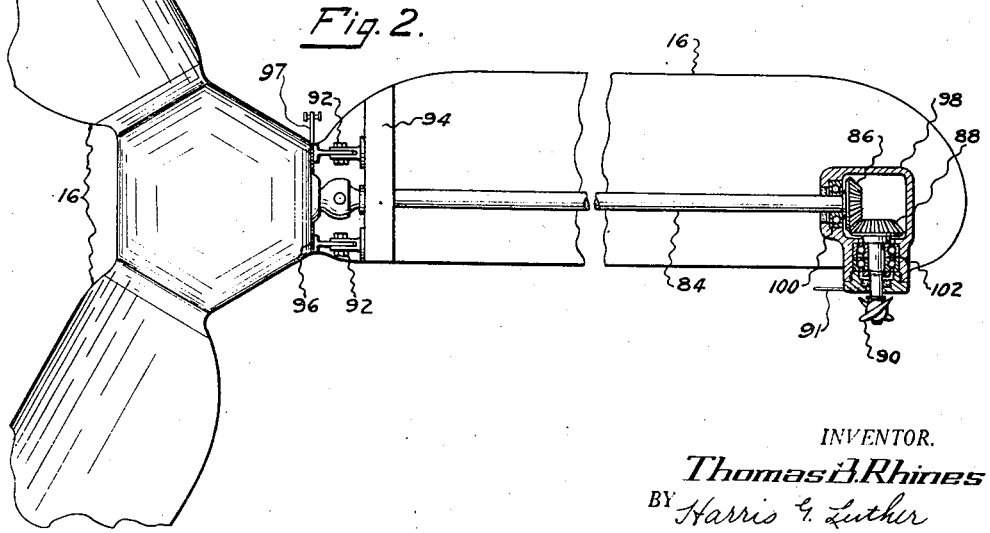
INVENTOR.
Thomas B. Rhines
BY Harris G. Luther
ATTORNEY Patented Jan. 6, 1942

2,268,552

UNITED STATES PATENT OFFICE 2,268,552

ROTOR OPERATING MECHANISM

Thomas B. Rhines, Glastonbury, Conn., assignor to United Aircraft Corporation, East Hartford, Conn., a corporation of Delaware Application July 14, 1939, Serial No. 284,471

17 Claims. (Cl. 244—17)

This invention relates to improvements in rotor drives for aircraft and has for an object the provision of an improved drive for an aircraft sustaining rotor which is effective to transmit power from an engine located in the body of the aircraft to the rotor without subjecting the aircraft body to the reaction to the torque transmitted to the rotor.

Other objects and advantages will be more particularly pointed out hereinafter or will become apparent as the description proceeds.

In the accompanying drawing, in which like reference numerals are used to designate similar parts throughout, there is illustrated a suitable mechanical arrangement for the purpose of disclosing the invention. The drawing, however, is for the purpose of illustration only and is not to be taken as in any way limiting or restricting the scope of the invention.

In the drawing, Fig. 1 is a vertical sectional view of a rotor drive constructed according to the invention, only fragmentary portions of the rotor and aircraft body being included, and Fig. 2 is a plan view of a fragmentary portion of the rotor, a portion thereof being broken away and shown in section to better illustrate the construction.

Referring to the drawing in detail, the numeral 10 generally indicates the body portion, or fuselage, of an aircraft, such as a helicopter. Within the fuselage 10 there is a suitable power plant, which may be in the form of a conventional internal combustion engine 12, and above the fuselage there is disposed the sustaining rotor, generally indicated at 14. The rotor comprises one or more hollow blade members 16 pivotally attached at their inner ends to a hub which may be in the form of a hollow casing 18 rigidly secured on the upper end of a substantially vertically disposed hollow drive shaft 20 having an intermediate support in the bracket 22 by means of the anti-friction thrust bearing 24, the bracket being disposed somewhat above the fuselage 10 and secured thereto by suitable means such as the struts 26.

A drive shaft 28 projects from the engine 12 into a gear case 30 which may conveniently be attached to and supported upon the engine. The drive shaft 28 is supported by bearings 32 and 34 in the gear case and is provided between these bearings with a worm 36 which meshes with a worm gear 38 on the lower end of a shaft 40, the upper end of which carries one element 42 of a one-way drive, generally indicated at 44. The one-way drive 44 may be any one of various forms well known to the prior art such as the conventional cam and roller type of one-way drive in which the inner driving member is provided in its periphery with tapered depressions in which are seated rollers which engage the annular inner surface of the outer driven member whenever the driving member is rotated in one direction with respect to the driven member and which roll into the deeper ends of the tapered depressions to permit free rotation of the driven member with respect to the driving member in the opposite direction of rotation. Between the worm 36 and the driving member 42 the shaft 40 is supported in a suitable anti-friction bearing 46 mounted in a transverse partition 48 of the gear case 30. The driven member 50 of the one-way drive 44 carries a beveled gear 52 and the concentric shaft 54 which extends upwardly through the hollow shaft 20 into the rotor carrying casing 18. The members 50, 52 and 54 may be integral with each other or made separately and rigidly secured together, as may be convenient. The gear 52 meshes with a plurality of beveled gears, as indicated at 56, having their axes of rotation disposed at right angles to the axis of rotation of the gear 52 and these idler gears in turn mesh with a beveled gear 58 rigidly secured to the lower end of the hollow shaft 20 within the gear case 30. The gears 56 are supported in bearings, as indicated at 60, fixed in the gear case 30 and the gear case is split along a plane including the axes of the shafts 40 and 54 so that the various gears and their supporting bearings may be assembled within the gear case. The two parts of the gear case are held together by suitable means, such as clamp bolts one of which is indicated at 62.

The lift or thrust of the rotor 14 is transmitted to the body portion 10 through the thrust bearing 24 which comprises an outer race 64 clamped in the bracket 22 by the shoulder 66 and nut 68. The inner race 70 is clamped to the shaft 20 by the shoulder 72 and nut 74, and the anti-friction elements 76 are disposed between the two race members. Such packing or sealing means may be included as may be necessary or desired to obtain proper lubrication of the bearing. The thrust is transmitted from the bracket 22 through the struts 26 to the body portion 10.

The outer hollow shaft 20 is connected directly to the casing 18 to which the rotor blades 16 are connected so that the rotor 14 is rotated when the gear 58 is rotated to turn the shaft 20. The shaft 54 carries at its upper end a beveled gear 78 which meshes with beveled gears, one of which is indicated at 80, which is connected by suitable means, such as the universal joint 82, the torque shaft 84 and the beveled gears 86 and 88 with a respective propeller 90 carried on the rotor blade 16. By this arrangement rotation of the inner shaft 54 upon rotation of the gear 52 drives the propellers 90 to rotate the rotor 14 in the same direction in which it is rotated by the shaft 20. The size and pitch of the propellers 90 and the ratios of the various gears are selected so that the power transmitted to the propellers is substantially equal to the power transmitted directly to the rotor through the shaft 20.

The propeller 90 may be of the fixed or adjustable pitch type or, as is preferred, it may be of the controllable type. The details of such a controllable propeller are omitted from the drawing for the sake of simplicity but it may be any of the types now well known such as that shown in United States Patent Number 2,032,255 issued February 25, 1936, to Frank W. Caldwell for Propeller, or United States Patent Number 2,174,717, issued October 3, 1939, to Frank W. Caldwell, Erle Martin and John E. Anderson for Multiposition controllable pitch propeller, suitable controls such as a conduit 91, or other control means being led back to a pilot's compartment.

With this arrangement, since the rotation of the gear 52 is in the reverse direction of the rotation of the gear 58 the reaction to the torque transmitted through the shaft 54 largely cancels the reaction to the torque transmitted through the shaft 20 and there is substantially no resulant torque reaction imposed on the body portion 10 tending to rotate the body portion in a direction opposite to the rotation of the rotor 14. The rotor blades 16 are preferably joined to the casing 14 in a manner which renders them movable in at least two directions, that is, up and down at their outer ends and rotatable about their respective longitudinal axes. This connection may include some suitable arrangement, such as the hinges 92, in Fig. 2, secured at their outer ends to construction members 94 of the respective rotor blades and secured at their inner ends to respective plates 96 rotatable about the axes of the shafts 84. Suitable controls such as lever 97 and link 99 may lead to the pilot's compartment for controlling the rotor pitch. This construction is shown only by way of example and such other arrangements as may be desired may be employed for pivotally connecting the rotor blades to the casing 14.

Such a construction permits a change of pitch of the rotor blades and a controllable pitch rotor is within the scope of my invention. The details of a pitch changing mechanism have not been shown on the drawing for the sake of simplicity but this mechanism may be of any well known form such, for example, as that shown in United States Patent Number 1,994,488, issued March 19, 1935, to Igor I. Sikorsky for Direct lift aircraft.

With either or both the rotor and propeller of the controllable pitch type it will be possible to vary the force required to turn them, and consequently their torque reaction. By varying the torque reaction of either the rotor or propeller the body portion 10 may be rotated in space or steered.

Each pair of gears 86 and 88 are preferably mounted in a respective gear case 98 carried by the respective rotor and their shafts are provided with suitable supporting bearings as indicated at 100 and 102 supported in the gear case 98. If desired, each gear case 98 may be connected with the construction elements 94 by a rigid torque tube surrounding the shaft 84 in a manner to relieve the rotor blades from the reaction to the torque transmitted through the respective shafts 84.

It should be understood that instead of the reverse gear arrangement 52, 56, 58 for driving the separate shafts 54 and 20 from a single source of power, two separate sources of power may be used and the reverse gear arrangement dispensed with.

It should also be understood that although the shafts 54 and 20 have been shown as concentric it is within the purview of my invention to have the shafts arranged in any desired manner as long as the torque reaction of the shafts on the body 10 are opposite and may be equalized.

While a particular constructional arrangement has been hereinabove described and illustrated in the accompanying drawing for the purpose of disclosing the invention, it is to be understood that the invention is not limited to the particular arrangement so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination with an aircraft sustaining rotor, a hub for said rotor, a rotor carried propeller, concentric shafts for respectively driving said rotor hub and said propeller, means for driving said shafts, and a reversing gear drive between said shafts.

2. In combination with an aircraft sustaining rotor and a power plant for driving the same, mechanism for driving said rotor from said power plant without imparting unbalanced reaction to the rotor driving torque to said aircraft comprising, a rotor hub, a propeller carried by said rotor at a location spaced from said hub, a shaft secured to said hub and having a driving connection with said power plant, means for driving said propeller, and a reverse gear drive between said shaft and said propeller driving means.

3. In combination with an aircraft sustaining rotor having one or more blades and a power plant for driving the same, mechanism for driving said rotor from said power plant without imparting unbalanced reaction to the rotor driving torque to said aircraft comprising, a rotor hub to which said blades are secured, a propeller carried by each blade at a location spaced from said hub, a shaft secured to said hub and having a driving connection with said power plant, means for driving said propeller, and a reverse gear drive between said shaft and said propeller driving means.

4. In combination with an aircraft sustaining rotor having one or more blades, and a power plant for driving the same, mechanism for driving said rotor from said power plant without imparting unbalanced reaction to the rotor driving torque to said aircraft comprising, a rotor hub to which said blades are secured, a propeller carried by each blade at a location spaced from said hub, a shaft secured to said hub and having a driving connection with said power plant, and means for driving said propellers including a shaft coaxial with said hub shaft, a reverse drive gear between said hub shaft and said coaxial shaft, and shaft and gear connections between said coaxial shafts and said propellers.

5. In combination with an aircraft sustaining rotor having one or more blades, and a power plant for driving the same, mechanism for driving said rotor from said power plant without imparting reaction to the rotor driving torque to said aircraft comprising, a rotor hub to which said blades are movably attached, a propeller carried by each blade at a location spaced from said hub, a shaft secured to said hub and extending downwardly into said aircraft, a second shaft coaxial with said hub attached shaft, a gear on the upper end of said second shaft, gear drives for said propellers meshing with said gear, a gear casing surrounding the lower ends of said shafts, a gear drive between the lower end of said second shaft and said power plant, a gear on said second shaft above said gear drive, a gear on the lower end of said hub attached shaft, and idler gears supported by said casing meshing with said beveled gears whereby when said second shaft is rotated in one direction by said power plant said hub attached shaft will be rotated in the opposite direction.

6. In combination with an aircraft sustaining rotor having one or more movably mounted blades, and a power plant for driving the same, mechanism for driving said rotor from said power plant without imparting reaction to the rotor driving torque to said aircraft comprising, a rotor hub to which said blades are movably attached, a propeller carried by each blade at a location spaced from said hub, a shaft secured to said hub and projecting at its lower end into said aircraft adjacent to said power plant, a second shaft coaxial with said hub attached shaft, a gear drive between said second shaft and said propellers, a gear case surrounding the lower ends of said shafts attached to and supported by said power plant, a gear drive between said power plant and said second shaft supported by said gear case, and a gear drive between said second shaft and said hub attached shaft also supported by said gear case said drive comprising a beveled gear on said second shaft, a beveled gear on the lower end of said hub attached shaft, and idler gears between said beveled gears mounted on bearings carried by said gear case whereby rotation of said second shaft by said power plant in one direction will rotate said hub attached shaft in the opposite direction.

7. In combination with an aircraft sustaining rotor having one or more movably mounted blades, and a power plant for driving the same, mechanism for driving said rotor from said power plant without imparting reaction to the rotor driving torque to said aircraft comprising, a rotor hub to which said blades are movably attached, a propeller carried by each blade at a location spaced from said hub, a shaft secured to said hub and projecting at its lower end into said aircraft adjacent to said power plant, a second shaft coaxial with said hub attached shaft, a gear drive between said second shaft and each of said propellers, a gear case surrounding the ends of said shafts within said aircraft, a worm and gear drive between said power plant and said second shaft supported in said gear case, and a reversing gear drive between said second shaft and said hub attached shaft also supported in said gear case, whereby rotation of said second shaft by said power plant will rotate said hub attached shaft in the opposite direction.

8. In combination with an aircraft sustaining rotor having one or more movably mounted blades, and a power plant for driving the same, mechanism for driving said rotor from said power plant without imparting the reaction to the rotor driving torque to said aircraft comprising, a rotor hub to which said blades are movably attached, a propeller carried by each blade at a location spaced from said hub, a shaft secured to said hub and projecting within said aircraft to a position adjacent to said power plant, a shaft coaxial with said hub attached shaft, a gear drive between said second shaft and each of said propellers, a gear case receiving the ends of said shafts adjacent to said power plant, a gear drive between said power plant and said second shaft, a reversing gear drive between said second shaft and said hub attached shaft, and a one-way driving connection between said power plant gear drive and said second shaft.

9. In combination with an aircraft sustaining rotor having one or more movably mounted blades and a power plant for driving the same, mechanism for driving said rotor from said power plant without imparting reaction to the rotor driving torque to said aircraft comprising, a rotor hub to which said blades are movably attached, a propeller carried by each blade at a location spaced from said hub, a shaft secured to said hub and extending to a location adjacent to said power plant, a second shaft coaxial with said hub attached shaft, a gear drive between said second shaft and each of said propellers, a gear drive between said second shaft and said power plant, and a reversing gear drive between said second shaft and said hub attached shaft whereby rotation of said second shaft in one direction by said power plant will rotate said hub attached shaft in the opposite direction, said propellers and said gear drives being so proportioned and designed that the torque developed by said propellers is substantially equal to the torque imparted to said rotor hub.

10. In combination with an aircraft rotor and an engine for driving said rotor, one or more propellers carried by said rotor acting to rotate the same, and means between said engine and said rotor for driving said rotor and said propellers independently.

11. In combination with an aircraft rotor and an engine for driving said rotor, one or more propellers carried by said rotor and acting to rotate the same, means between said rotor and said engine for driving said rotor and said propellers independently and means for applying different portions of the power of said engine in opposite directions to said independent driving means.

12. In combination, a single rotor, a body supported by said rotor, and two means for rotating said rotor in the same direction, means for transmitting power from said body to one of said rotating means, and having a torque reaction on said body in one direction and means having a torque reaction on said body in the opposite direction for transmitting power from said body to the other of said rotating means.

13. In combination, a rotor, a body adapted to be suspended from said rotor and containing a source of power, means connecting said rotor with said source of power for rotating said rotor in one direction, and having a torque reaction in one direction on said body, other means for rotating said rotor in said one direction and means connecting said other means with a source of power in said body and having a torque reaction on said body in the opposite direction from said first mentioned torque reaction.

14. In combination with an aircraft sustaining rotor, means associated with said rotor for exerting a force on the surrounding air to rotate said rotor, a body supported by said rotor, means supported by said body for supplying power to rotate said rotor, said power supply comprising means for mechanically applying a portion of said power to the rotor for mechanically rotating the same and means for mechanically applying a portion of said power to said first mentioned means, said two power applying means having torque reactions in opposite directions on said body.

15. In combination with an aircraft sustaining rotor, means carried by said rotor for exerting a force on the surrounding air to rotate said rotor, a body supported by said rotor and carrying power supply means, a shaft connecting said power supply means with said rotor for rotating the same and having a torque reaction on said body in one direction, another shaft connecting said first mentioned means with said power supply means and having a torque reaction on said body in the opposite direction.

16. In an aircraft, a fuselage, a direct lift rotor rotatably mounted on said fuselage, an engine supported by said fuselage and stationary relative thereto for driving said rotor, a drive shaft projecting from said fuselage and operatively connected with said rotor for rotating the same in one direction, propellers carried by said rotor for rotating said rotor in the same direction, another drive shaft operatively connected with said propellers, and a driving connection between the crankshaft of said engine and both of said drive shafts, said driving connection including power dividing means operative to balance the torque reaction of said rotor against the torque reaction of said propellers to cancel the torque reaction between said rotor and said fuselage.

17. In an aircraft, a fuselage, a rotor rotatably mounted on said fuselage, a rotor driving engine having a crankshaft and having cylinders fixed relative to said fuselage and carried by said fuselage, a drive shaft projecting from said fuselage and operatively connected with said rotor for rotating the same in one direction, propellers carried by said rotor for rotating said rotor in the same direction, another drive shaft operatively connected with said propellers, and a driving connection between the crankshaft of said engine and both of said rotor driving shafts, said driving connection comprising power dividing means including a reversing gear train connecting said crankshaft with one of said drive shafts and other means connecting said crankshaft with the other drive shaft.

THOMAS B. RHINES.